United States Patent [19]

Southwell

[11] 3,873,208
[45] Mar. 25, 1975

[54] MEASURING THE INDEX OF REFRACTION
[75] Inventor: William H. Southwell, Pittsburgh, Pa.
[73] Assignee: Owens-Illinois, Inc., Toledo, Ohio
[22] Filed: July 23, 1973
[21] Appl. No.: 381,885

[52] U.S. Cl. ................... 356/128, 356/135, 356/246
[51] Int. Cl. .......................................... G01n 21/46
[58] Field of Search ........... 356/128, 133, 134, 135, 356/136

[56] References Cited
UNITED STATES PATENTS
3,784,308   1/1974   Southwell et al. .................. 356/128

Primary Examiner—Ronald L. Wibert
Assistant Examiner—Matthew W. Koren
Attorney, Agent, or Firm—Charles S. Lynch; E. J. Holler

[57] ABSTRACT

A method and apparatus for measuring the index of refraction of a cylindrical article of material wherein a beam of radiant energy to which the article is transparent is directed against a peripheral surface of the article at an acute angle to a tangent thereto, the article is moved relative to the beam until the light is internally reflected and emanates from the point of incidence outwardly at an acute angle such that the angle between the incident beam and the redirected beam is equal to $2\theta$ and the index of refraction is determined by the relationship $n = 2\sin\theta$.

20 Claims, 8 Drawing Figures

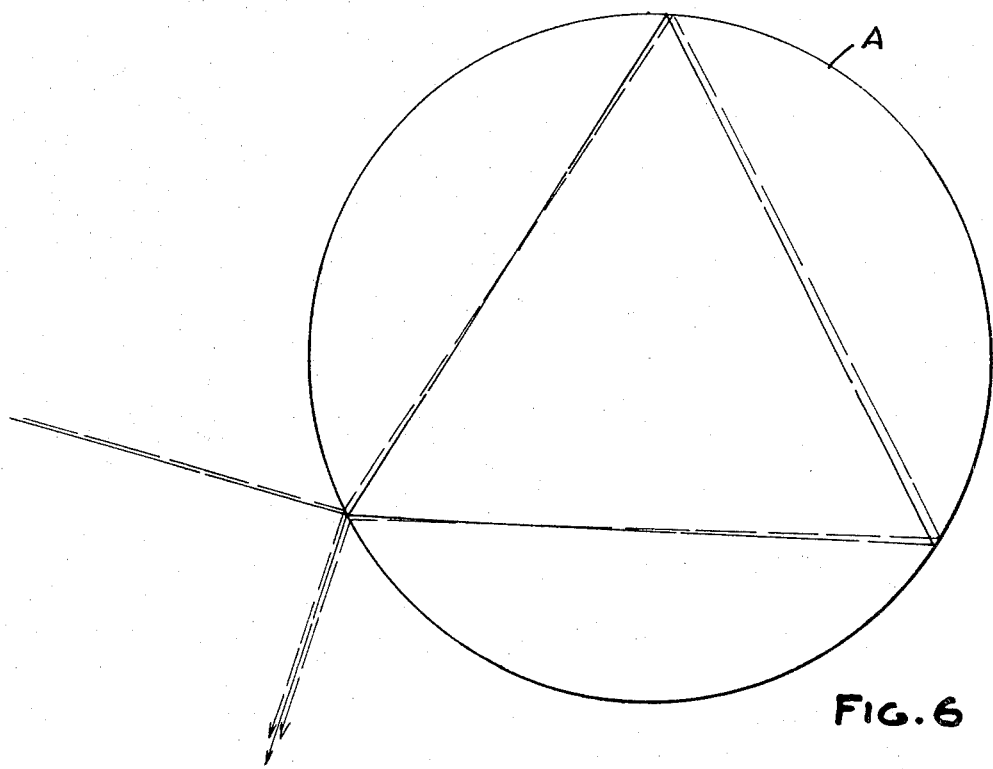
FIG. 6
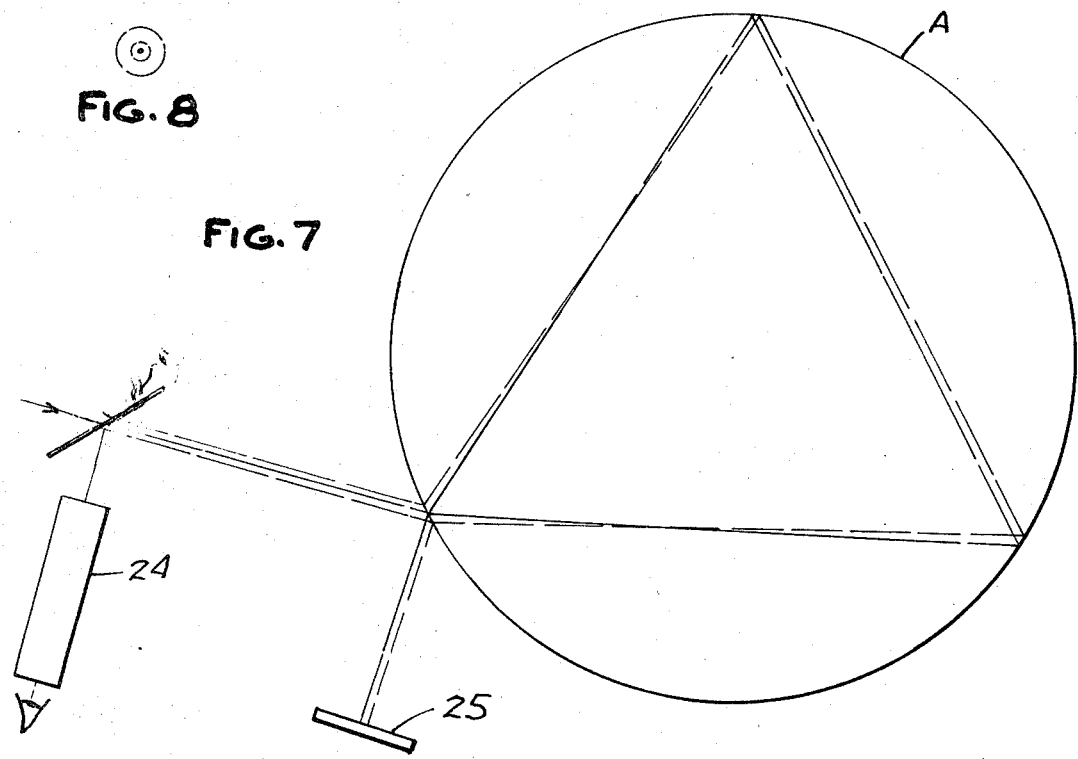
FIG. 8
FIG. 7

MEASURING THE INDEX OF REFRACTION

This invention relates to measuring the index of refraction of articles of transparent material.

BACKGROUND OF THE INVENTION

In the measurement of the index of refraction of an article such as that of glass, it is conventional to utilize a prism which is cut out of a piece of glass and then actually measure the angle of incidence and refraction from which the refractive index is determined by Snell's Law.

Such devices necessitate destroying the article or having an extra piece for use in measurement for the index of refraction and also require accurate visual observation.

Among the objects of the invention are to provide a method and apparatus for inspecting round articles such as lens blanks or lenses without destroying them, without the need for making a prism, which can be conducted at any time that there is a cylindrical surface on the article which will produce an accurate determination of the index of refraction and which can be done quickly and efficiently with a minimum of material.

SUMMARY OF THE INVENTION

In accordance with the invention, the method and apparatus for measuring the index of refraction of a cylindrical article of material comprises directing a beam of radiant energy to which the article is transparent against a peripheral surface of the article at an acute angle to a tangent thereto, moving the article relative to the beam until the light is internally reflected and emanates from the point of incidence outwardly at an acute angle such that the angle between the incident beam and the redirected beam is equal to $2\theta$ and the index of refraction is determined by the relationship $n=2\sin\theta$.

DESCRIPTION OF THE DRAWINGS

FIG. 6 is a partly diagrammatic view showing the path of principal light rays refracted by a workpiece.

FIG. 7 is a view similar to FIG. 6 showing the principal light rays which are redirected into and out of the workpiece.

FIG. 8 is a diagrammatic cross sectional view of a beam returning from a workpiece.

DESCRIPTION

Figure 1:
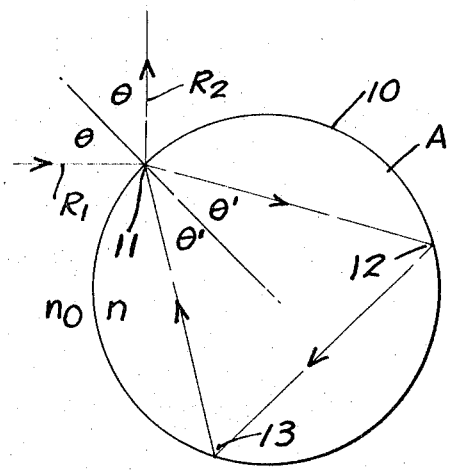
FIG. 1 is a diagrammatic view of the method and apparatus embodying the invention.

Referring to FIG. 1, the invention can be utilized to determine the index of refraction of an article A having a cylindrical surface 10 by directing a beam of radiant energy to which the materials of the article A are transparent from a source along the path represented by $R_1$ at an acute angle to a tangent at a point of incidence 11 with the interface and moving the article A transversely to the beam until the beam is refracted and internally reflected at two points 12 and 13 and thereafter refracted out at the interface in a beam $R_2$ where the angle between the beams $R_1$ and $R_2$ is equal to $2\theta$. Since the beam is moved along a path within the interface defining an equilateral triangle, the included angle of each corner of the triangle is equal to 60°. This makes the angle of refraction $\theta'$ equal to 30° and the angle of incidence $\theta$ can be determined by the relationship $$n_0 \sin\theta = n \sin\theta' \qquad (1)$$

where $n_0$ is the index of refraction of the known material and $n$ is the index of refraction of the unknown material such that $$n = 2n_0 \sin\theta \qquad (2)$$

Since $\sin\theta$ may approach one, $n = 2$ is the upper limit for the triangular condition to be established in air. However, if the sample is submerged in a gas or liquid substance of index $n_0$, then $2n_0$ is the upper limit on $n$. The lower limit on $n$ will be the case of no refraction or $\theta = 30°$ corresponding to $n=1$.

Figure 2:
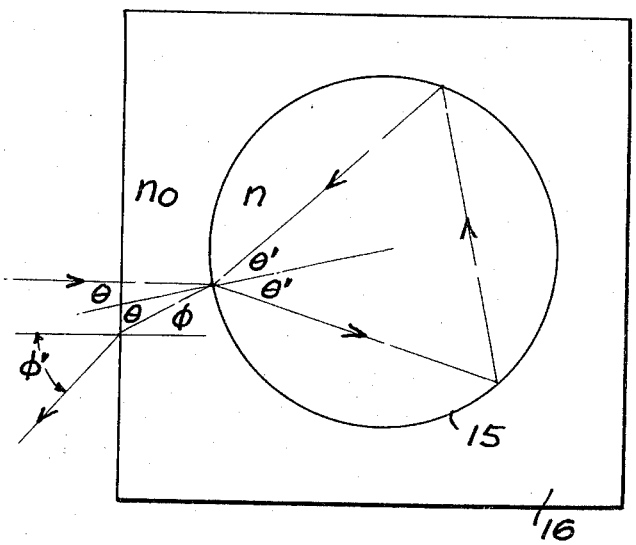
FIG. 2 is a diagrammatic view of a modified form of method and apparatus.

For liquids and gases having indices less than the indices of solids, the triangular condition may be established when the surrounding material is a solid of known index $n_0$ and the unknown fluid substances with index $n$ is contained in the cylindrical cavity. This condition is shown in FIG. 2.

In this relationship, the following equations can be utilized to determine the index of refraction of the gas or liquid in the cylindrical chamber 15 of the body 16.

$$n = 2n_0 \sin\theta \qquad (3)$$

$$\theta = \phi/2 \qquad (4)$$

$$\sin\phi' = n_0 \sin\phi \qquad (5)$$

By differentiating equation (2) above, we can establish the accuracy to which $n$ may be determined from the measured accuracy of $\theta$. If the differential $\delta n$ is the uncertainty in $n$ resulting from the uncertainty $\delta\theta$, we have $$\delta n = 2\cos\theta \delta\theta \qquad (6)$$

Thus, for a material of index $n=1.6$, for example, $\delta n = 1.2\delta\theta$. Thus, to determine $n$ within one unit in the fifth decimal place, $\theta$ must be measured within 1.7 seconds of arc.

In order to utilize the above triangulation condition to measure refractive indices, it is necessary to measure $\theta$. Since at each internal refraction, there is also an exit beam, there exist several ways to determine $\theta$ utilizing various devices.

Figure 3:
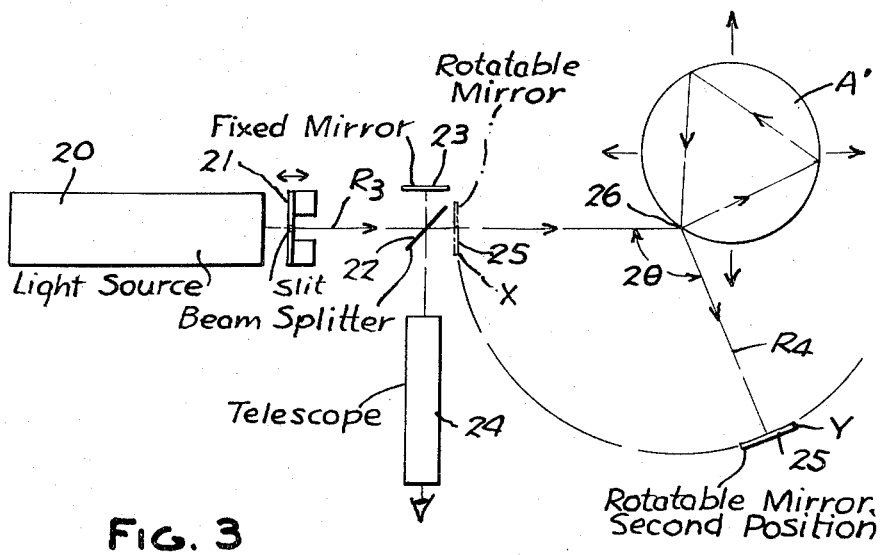
FIG. 3 is a partly diagrammatic view of a further modified form of the apparatus.

Thus, referring to FIG. 3, a light source 20 is caused to emanate a noncoherent beam $R_3$ after passing through a slit 21. A typical source 20 may comprise a thermal or gas discharge source with filters or a monochromatic source. The beam $R_3$ is directed through a beamsplitter 22, a portion of the beam being reflected at a right angle against a fixed mirror 23 having its plane parallel to the beam. The mirror 23 redirects the beam passed through the beamsplitter 22 to a telescope 24 having its line of vision at a right angle to the path of the beam R₃. The portion of the beam R₃ passing through the beamsplitter 22 is directed against a mirror 25 that is rotatable in an arc about a point 26. The fixed mirror 23 is utilized initially to visually determine overlap of the slit image to initially align the mirror 25 on the platform. When in the position X, with its plane at a right angle to the beam R₃, the images from the mirrors 23, 25 should be centered over the cross hairs of the telescope 24.

The mirror 25 is then rotated to position Y and the sample A' is moved relative to the beam to bring the periphery thereof at the point of incidence 26 causing internal reflection in a triangular path and redirection of the beam as at R₄ toward the mirror 25 at position Y. Movement of the article A' and the mirror 25 is continued until perfect triangulation is achieved. The mirror 25 returns the beam R₄ to the point of incidence 26 and causes a reflection back along the line of the beam R₃.

The article A' is manually positioned until the front reflected beam is seen to overlap or coincide with the less intense third exit beam of the internal triangle. The rotatable mirror is then manually positioned to intersect these beams normally and return them back into the beamsplitter and telescope. The virtual images of the slit will be located just behind the first surface in the sample. This is due to the negative lens effect of the front surface reflections. This effect demagnifies the slits and places their virtual images close to each other so that they are both in focus in the telescope.

A third image resulting from the front surfaces reflected ray going back along the triangle in the opposite direction and coming out into the beamsplitter will be in focus in the telescope.

Fine angular adjustments of the mirror position and translational adjustments of the sample or article will bring the two images to coincide over the cross hairs of the telescope assuring that the triangular position is established and that the mirror is normal to the first reflected beam. The slit location may be adjusted until the slit image through the fixed mirror is in simultaneous focus with the overlapping images from the sample. This eliminates the need to focus the telescope between readings which could introduce alignment errors.

The second mirror position is read on scale and the difference from its initial position is $2\theta$. The equation (2) above is then used to determine the index of refraction $n$.

The triangulation method described above, may also be used with coherent sources such as lasers which produce very small highly collimated and highly monochromatic beams. For example, with helium-neon and argon CW lasers, several wave lengths are readily available throughout much of the visual spectrum and tunable dye lasers are capable of selecting desired wave lengths from the ultraviolet to the infrared. Moreover, laser beams are easy to autocollimate.

If such a coherent source is established, the two beams emerging from the article will interfere forming a symmetrical fringe portion, as shown diagrammatically in FIG. 6, which can be viewed on a screen positioned in the normal path of the telescope in order to obviate viewing the laser directly with the eyes. When the mirror 25 returns the beam back again, three fringe patterns are seen on the screen, (FIGS. 7 and 8). One is large and two are much smaller. When these patterns overlap the system is adjusted and the angular position may be read (FIG. 8). Due to the small size of the laser beam, it may be necessary to sensitively adjust the position of the article through the motion of a translation stage holding the sample.

Figure 4:
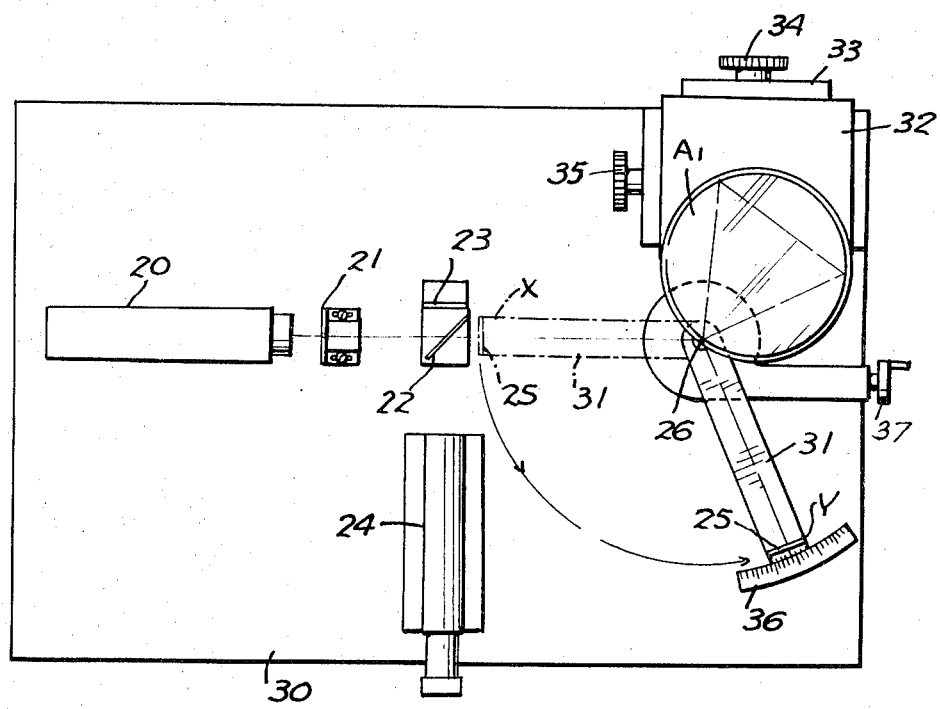
FIG. 4 is a plan view of an apparatus embodying the invention.
Figure 5:
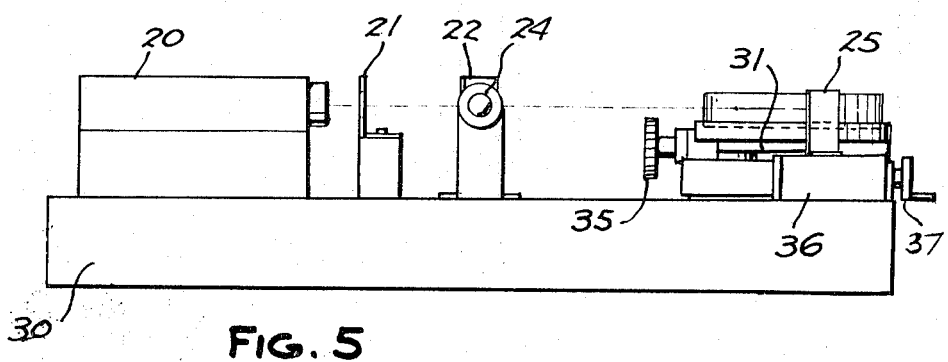
FIG. 5 is an elevational view of an apparatus embodying the invention.

A typical apparatus for performing the refraction measurement is shown in FIG. 4 wherein similar reference numerals are used for clarity. The apparatus comprises a base 30 on which the light source 20, slit 21, mirror 23 and beamsplitter 22 are mounted. The mirror 25 is mounted on an arm 31 pivoted about an axis 26 intersecting the beam from source 20. The article A' is supported on a slide 32 which in turn is supported on a cross slide 33 each of which is manipulable by knobs 34, 35 actuating suitable drive so that the article can be moved transversely and longitudinally with respect to the incoming beam. A scale 36 is provided for measuring the angle between X and Y positions of mirror 25. A knob 37 connected by a suitable drive is provided for moving mirror 25.

I claim:

1. The method of measuring the index of refraction of an unknown material surrounded by a known material wherein there is a round interface between the materials which comprises directing a beam of radiant energy to which the materials are transparent against said interface at an acute angle to a tangent thereto, moving the materials relative to the beam in the direction transverse thereto until the light is internally reflected and emanates at the interface at an acute angle to a tangent at the point at which the beam first impinges on the interface, whereby the included angle between the entering beam and emanating beam is equal to $2\theta$ where $\theta$ is the angle of incidence, $n$ is the index of refraction of the unknown material, $n_0$ is the index of refraction of the known material and the relationship is represented by the formula $n=2n_0\sin\theta$.

2. The method set forth in claim 1 including the step of positioning a mirror in the path of the emanating beam to redirect the beam against the interface and thereafter along the line of the beam directed to the interface and moving the article relative to the beam until there is coincidence of the entering and redirected beams, such that the angle therebetween is equal to $2\theta$.

3. The method set forth in claim 1 wherein said beam comprises a noncoherent beam.

4. The method set forth in claim 1 wherein said beam comprises a coherent beam such that the beam directed to the article and the emanating beam reflected from the article define interference fringes which coincide when the beams coincide.

5. The method of measuring the index of refraction of a round article of material which comprises directing a beam of radiant energy to which the article is transparent against the peripheral surface of said article at an acute angle to a tangent thereto, moving the article relative to the beam in the direction transverse thereto until the article is in the position where the light is internally reflected and emanates at an acute angle to a tangent at the point at which the beam first contacts the peripheral surface, whereby the included angle between the entering beam and emanating beam is equal to $2\theta$ where $\theta$ is the angle of incidence, $n$ is the index of refraction of the unknown material, $n_0$ is the index of refraction of the known material and the relationship is represented by the formula $n=2n_0\sin\theta$.

6. The method set forth in claim 5 including the step of positioning a mirror in the path of the emanating beam to redirect the beam against the peripheral surface of the article and thereafter along the line of the beam directed to the article and moving the article relative to the beam until there is coincidence of the entering and redirected beams, such that the angle therebetween is equal to $2\theta$.

7. The method set forth in claim 5 wherein said beam comprises a noncoherent beam.

8. The method set forth in claim 5 wherein said beam comprises a coherent beam such that the beam directed to the article and the emanating beam define interference fringes which coincide when the beams coincide.

9. The method of measuring the index of refraction of fluid material which comprises confining said material in a body of material having a round wall defining an interface with said material, directing a beam of radiant energy to which the material and body are transparent against said interface at an acute angle to a tangent thereto, moving the body relative to the beam in the direction transverse thereto until the light is internally reflected and emanates at the interface at an acute angle to a tangent at the point at which the beam first impinges on the interface, whereby the included angle between the entering beam and emanating beam is equal to $2\theta$ where $\theta$ is the angle of incidence, $n$ is the index of refraction of the unknown material, $n_0$ is the index of refraction of the body and the relationship is represented by the formula $n=2n_0\sin\theta$.

10. The method set forth in claim 9 including the step of positioning a mirror in the path of the emanating beam to redirect the beam against the interface and thereafter along the line of the beam directed to the interface and moving the article relative to the beam until there is coincidence of the entering and redirected beams, such that the angle therebetween is equal to $2\theta$.

11. The method as set forth in claim 9 wherein said beam comprises a noncoherent beam.

12. The method set forth in claim 9 wherein said beam comprises a coherent beam such that the beam directed to the article and the emanating beam define interference fringes which coincide when the beams coincide.

13. The method set forth in claim 9 wherein said body comprises a straight side and said beam is directed at a right angle to said body before impinging on said interface.

14. The method set forth in claim 13 wherein said redirected beam which emanates from said interface is refracted at a surface of said body such that the angle of incidence $\theta$ is related to the emerging angle according to the relationship $\sin\phi'=n_0\sin2\theta$.

15. An apparatus for measuring the index of refraction comprising a light source for directing a beam of radiant energy to which the material is transparent, a first fixed mirror having its plane parallel to said beam, a beamsplitter positioned in the path of said beam adjacent said first fixed mirror for directing a portion of said beam to said fixed mirror, viewing means having its line of vision aligned with said beamsplitter and said fixed mirror such that the portion of the beam on said beamsplitter is directed first against said fixed mirror and thereafter transmitted through said beamsplitter to said viewing means, a support for the material, the refraction of which is to be measured, said support being movable relative to said beam, a second mirror pivotally mounted for movement about an axis intersecting said beam from a first position wherein the plane thereof is at a right angle to said beam to a second position angularly related to said beam such that the material may be moved by moving said support to cause the beam directed toward the material to enter the material and to be internally reflected in said material and emanate therefrom at the point of incidence of said entering beam and said second rotatable mirror may be positioned in the path of said emanating beam to redirect said beam and cause it to be reflected from the point of incidence back along the path of the entering beam at an angle equal to $2\theta$ between the entering and emanating beam wherein the index of refraction is related to $\theta$ by the relationship $n=2n_0\sin\theta$.

16. The combination set forth in claim 15 wherein said light source comprises a noncoherent light source.

17. The combination set forth in claim 15 wherein said light source comprises a coherent light source.

18. The combination set forth in claim 15 wherein said viewing means comprises a telescope.

19. The combination set forth in claim 15 wherein said viewing means comprises a screen against which the portion of said beam reflected by said first fixed mirror and redirected by said movable mirror is directed.

20. The apparatus set forth in claim 15 wherein said support comprises a body to which the beam is transparent and which provides a cylindrical interface containing said material which is a fluid.

* * * * *